United States Patent [19]

Chong, Jr.

[11] Patent Number: 6,098,155
[45] Date of Patent: Aug. 1, 2000

[54] APPARATUS AND METHOD FOR STREAMLINING DATA TRANSFER WITH EXISTING INTERCONNECT BANDWIDTH

[75] Inventor: Fay Chong, Jr., Cupertino, Calif.

[73] Assignee: Sun Microsystems, Inc., Palo Alto, Calif.

[21] Appl. No.: 08/742,602

[22] Filed: Oct. 28, 1996

[51] Int. Cl.[7] .................................................. G06F 12/08
[52] U.S. Cl. .......................... 711/138; 711/113; 711/114; 711/162; 707/204; 714/6; 714/11
[58] Field of Search ..................................... 711/112, 113, 711/114, 138, 162; 714/6, 11; 707/204

[56] References Cited

U.S. PATENT DOCUMENTS

| | | | |
|---|---|---|---|
| 4,423,479 | 12/1983 | Hanson et al. ............................ | 711/113 |
| 4,500,954 | 2/1985 | Duke et al. .............................. | 711/138 |
| 4,571,674 | 2/1986 | Hartung et al. .......................... | 711/114 |
| 5,247,618 | 9/1993 | Davis et al. ............................. | 395/841 |
| 5,896,492 | 4/1999 | Chong, Jr. .............................. | 395/182.01 |

*Primary Examiner*—Do Hyun Yoo
*Assistant Examiner*—Hiep T. Nguyen
*Attorney, Agent, or Firm*—Park & Vaughan LLP

[57] ABSTRACT

An efficient memory retrieval/storage schemes for a fault tolerant memory control system for a computer system having a host processor, a mass storage memory and a system interconnect. The memory control system includes a primary memory controller and a backup memory controller with taps between the memory controllers to increase fault tolerance. Data is transferred between the host processor and the mass storage memory in the form of data packets. During a write operation, instead of receiving a data packet from the host processor, storing the data content, retrieving the data and then generating a new data packet for the mass storage memory, the memory controller redirects the data packets without the need to copy the data into the controller cache. Similarly, during a read operation, instead of receiving a data packet from the mass storage memory, storing the data content, retrieving the data and then generating a new data packet for the host processor, the memory controller redirects the data packets without the need to copy the data into the controller cache. Upon receipt of the data packets, verification packets are sent from the memories devices to the memory controller which then sends a confirmation packet to the host processor. Advantages of the present invention include reduced load on the system interconnect, reduced latency in backing up data, and reduced latency in recovering from partial system failures. In addition, the change in software and hardware needed to implementation such a solution is minimal since most of the backup functionality is provided by existing hardware.

18 Claims, 15 Drawing Sheets

APPARATUS AND METHOD FOR STREAMLINING DATA TRANSFER WITH EXISTING INTERCONNECT BANDWIDTH

BACKGROUND OF THE INVENTION

1. Incorporation by Reference

Co-pending application, patent application Ser. No. 08/742,603, issued as U.S. Pat. No. 5,896,492 on Apr. 20, 1996 hereby incorporated by reference in its entirety.

2. Field of the Invention

This invention relates to the field of data transfers in a computer system. More particularly, the present invention relates to streamlining data transfers using the existing bandwidth in the computer system.

3. Description of the Related Art

The proliferation of high data retrieval rate applications such as on-demand video servers has resulted in a corresponding need for computer systems which have reliable mass storage systems capable of high bit-rate transfers. FIG. 1 is a block diagram of a conventional computer system 100 which includes a host processor 110, a host memory 105, a memory controller 120 and a bank of memory devices 141, 142, 143 and 144, e.g., disk drives. The inclusion of memory controller 120 provides partial relief to the processing load of host processor 110 by offloading the burden of the device-level read/write steps required for transferring data to/from drives 141, 142, 143, 144.

For example, to initiate a read operation, host processor 110 simply sends a controller read command to controller 120 and then waits for a corresponding controller data packet from controller 120. As a result, host processor 110 can be freed up quickly to support other processes while the controller 120 retrieves the data from drives 141, 142, 143, 144. Upon receiving the controller read command, controller 120 translates the controller read command into a number of device read commands, which are then issued to the corresponding drives 141, 142, 143, 144.

Referring now to FIG. 2, in response to the device read commands, drives 141, 142, 143, 144 form device data packets 241, 242, 243, 244, respectively, all the device data packets destined for controller 120. Note that read data R1, R2, R3, and R4 represent the respective requested data from drives 141, 142, 143, 144. Controller 120 stores data R1, R2, R3, R4 in controller cache 125. Next, controller 120 forms a corresponding number of controller data packets 221, 222, 223, 224 destined for host processor 110, which includes data R1, R2, R3 and R4, respectively.

Referring now to FIG. 3, to initiate a write operation, host processor 110 sends a number of controller data packets 311, 312, 313, 314, destined for controller 120. Controller 120 is now responsible for ensuring that the write data W1, W2, W3 and W4 arrive at their respective final destinations, i.e., arrive at drives 141, 142, 143, 144. First, controller 120 copies the write data W1, W2, W3, W4 into controller cache 125. Controller 120 then forms a corresponding number of device data packets 331, 332, 333, 334 and issues them to drives 141, 142, 143, 144, respectively.

Unfortunately, in the conventional read and write operations described above, the penalty for offloading the device-level steps from host processor 110 causes controller 120 to temporarily store the read/write data in cache 125. As a result, the bandwidth requirement on interconnect 182 is twice the underlying bit-rate needed for transferring data from host processor 110 to memory 140 without the use of any memory controller.

Hence, there is a need for an efficient scheme for storing and retrieving data which offloads the host processor without requiring a significant increase in bandwidth of the system interconnect.

SUMMARY OF THE INVENTION

The present invention provides efficient memory retrieval/storage schemes for a fault tolerant memory control system for a computer system having a host processor, a mass storage memory and a system interconnect. The memory control system includes a primary memory controller and a backup memory controller with taps between the memory controllers to increase fault tolerance.

Data is transferred between the host processor and the mass storage memory in the form of data packets. In one embodiment, during a write operation, instead of receiving a data packet from the host processor, storing the data content, retrieving the data and then generating a new data packet for the mass storage memory, the memory controller redirects the data packets without the need to copy the data into the controller cache.

Similarly, during a read operation, instead of receiving a data packet from the mass storage memory, storing the data content, retrieving the data and then generating a new data packet for the host processor, the memory controller redirects the data packets without the need to copy the data into the controller cache.

In another embodiment, a combined data packet is addressed to the memory device on the last node. Memory device(s) located between the memory controller and the last node "tap" to extract a data portion from the combined data packet.

In some embodiments, upon receipt of the data packets, verification packets are sent from the memory devices to the memory controller which then sends a confirmation packet to the host processor.

Advantages of the present invention include reduced load on the system interconnect, reduced latency in backing up data, and reduced latency in recovering from partial system failures.

In addition, the change in software and hardware needed to implement such a solution is minimal since most of the backup functionality is provided by existing hardware.

DESCRIPTION OF THE DRAWINGS

The objects, features and advantages of the system of the present invention will be apparent from the following description in which.

DESCRIPTION OF THE PREFERRED EMBODIMENT

In the following description, numerous details provide a thorough understanding of the invention. These details include functional blocks, exemplary architectures and protocols to aid implementation of efficient memory retrieval/ storage schemes in a fault tolerant computer system. In addition, while the present invention is described with reference to specific embodiments, the invention is applicable to a wide range of memory subsystems and computer architectures. In other instances, well-known circuits and structures are not described in detail so as not to obscure the invention unnecessarily.

Figure 1:
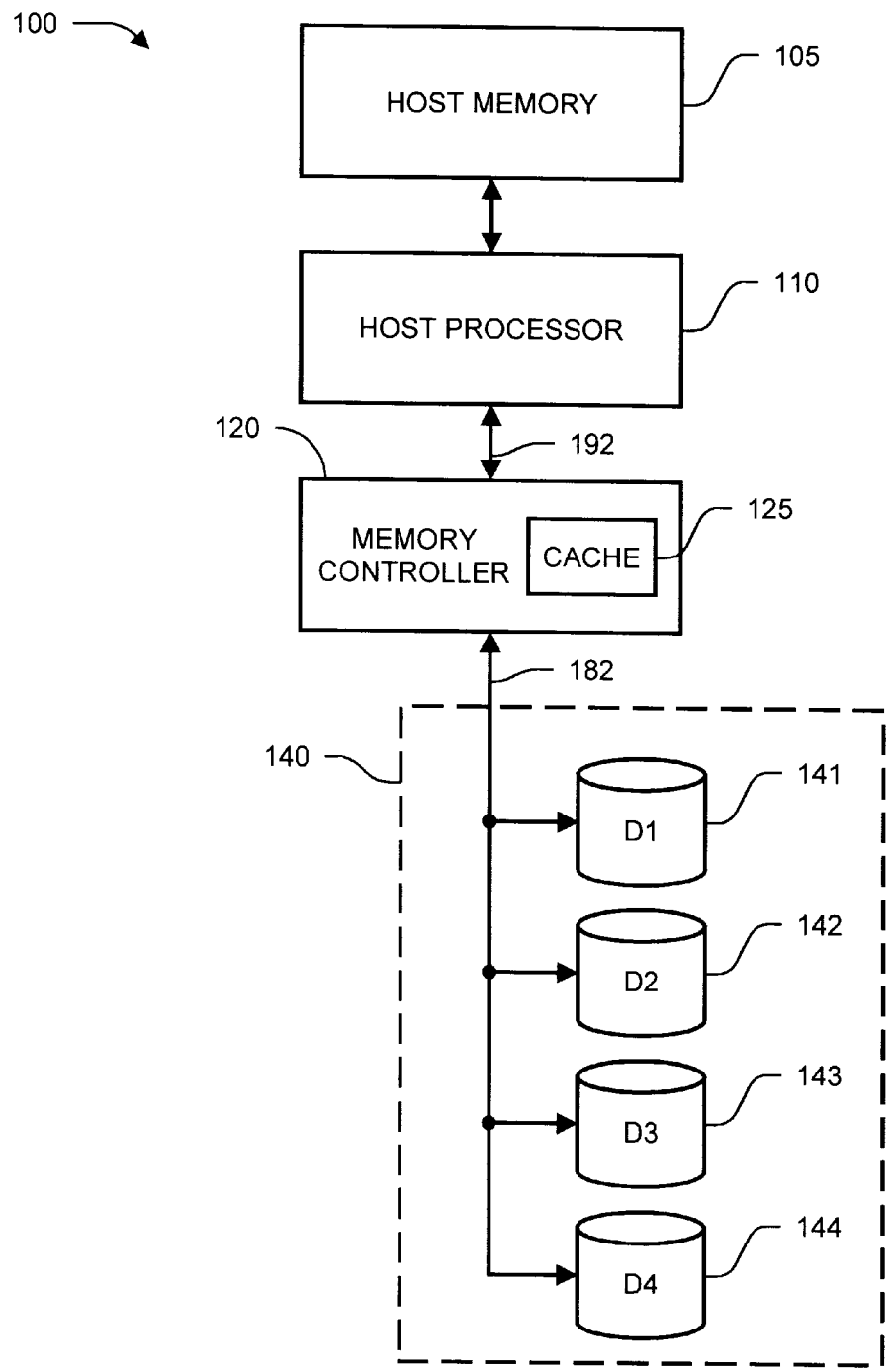
FIG. 1 illustrates a conventional memory control system.
Figure 2:
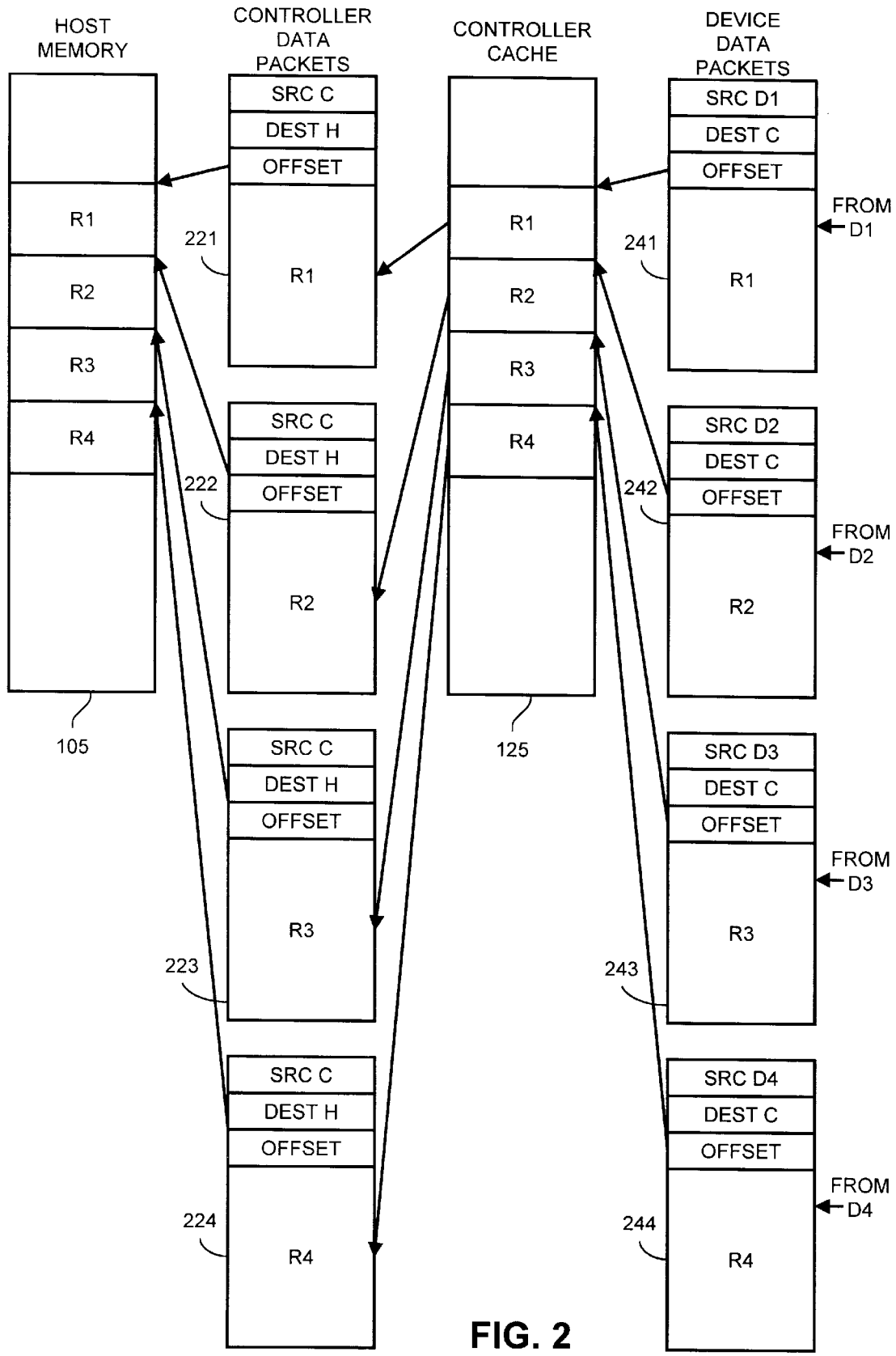
FIGS. 2 and 3 are block diagrams illustrating conventional read and write operations.
Figure 3:
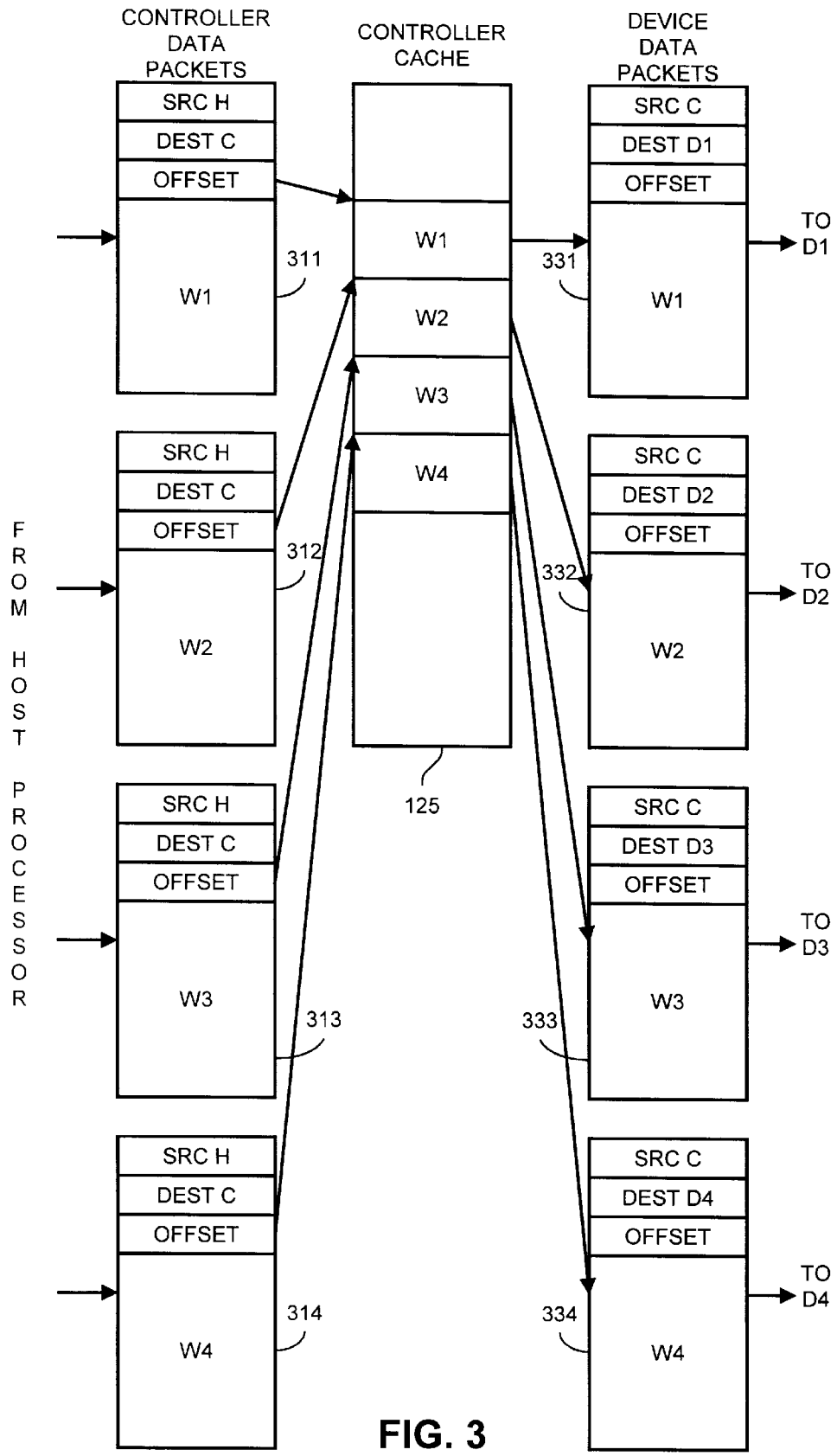
Figure 4:
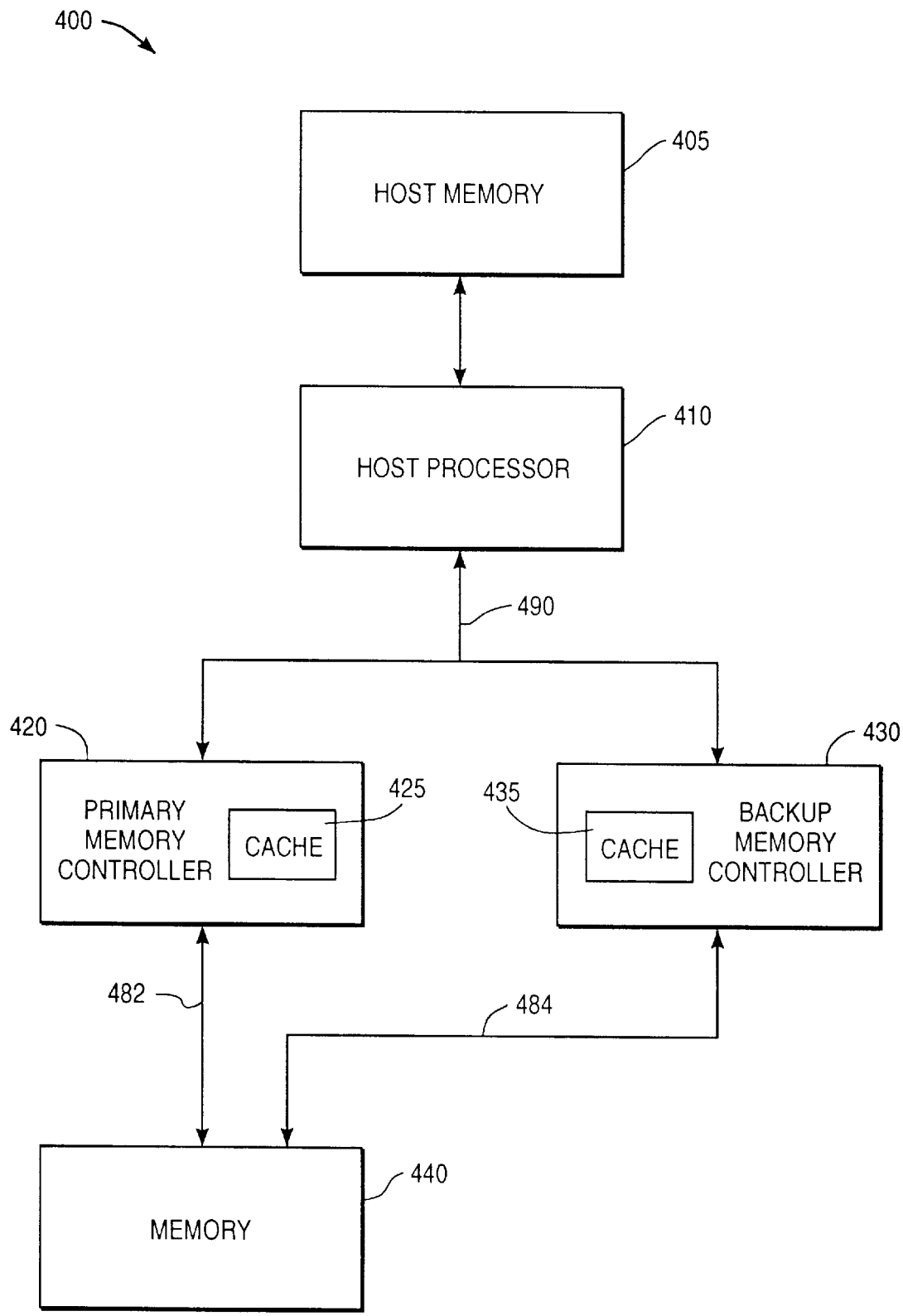
FIG. 4 is a block diagram showing a memory control system for implementing the present invention.

FIG. 4 is a block diagram of a fault tolerant computer 400 for implementing the efficient memory retrieval and storage schemes of the present invention. Computer 400 includes a host processor 410, a host memory 405, a primary memory controller 420, a backup memory controller 430 and a mass storage memory 440. A detailed description of computer 400 is provided by U.S. Pat. No. 5,896,492 assigned to Sun Microsystems.

Figure 5A:
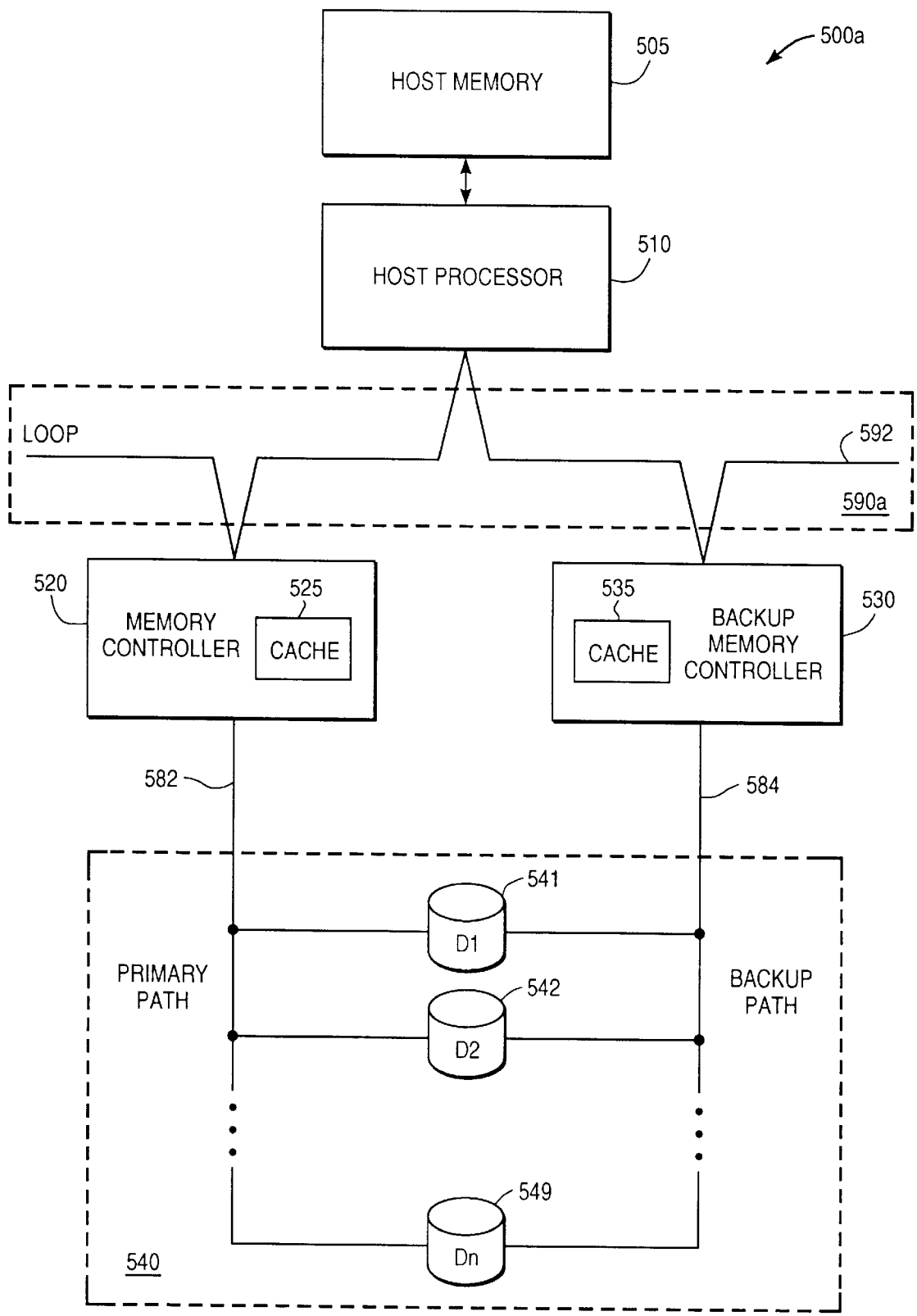
FIGS. 5A and 5B illustrate two fault tolerant embodiments for implementing the present invention.
Figure 5B:
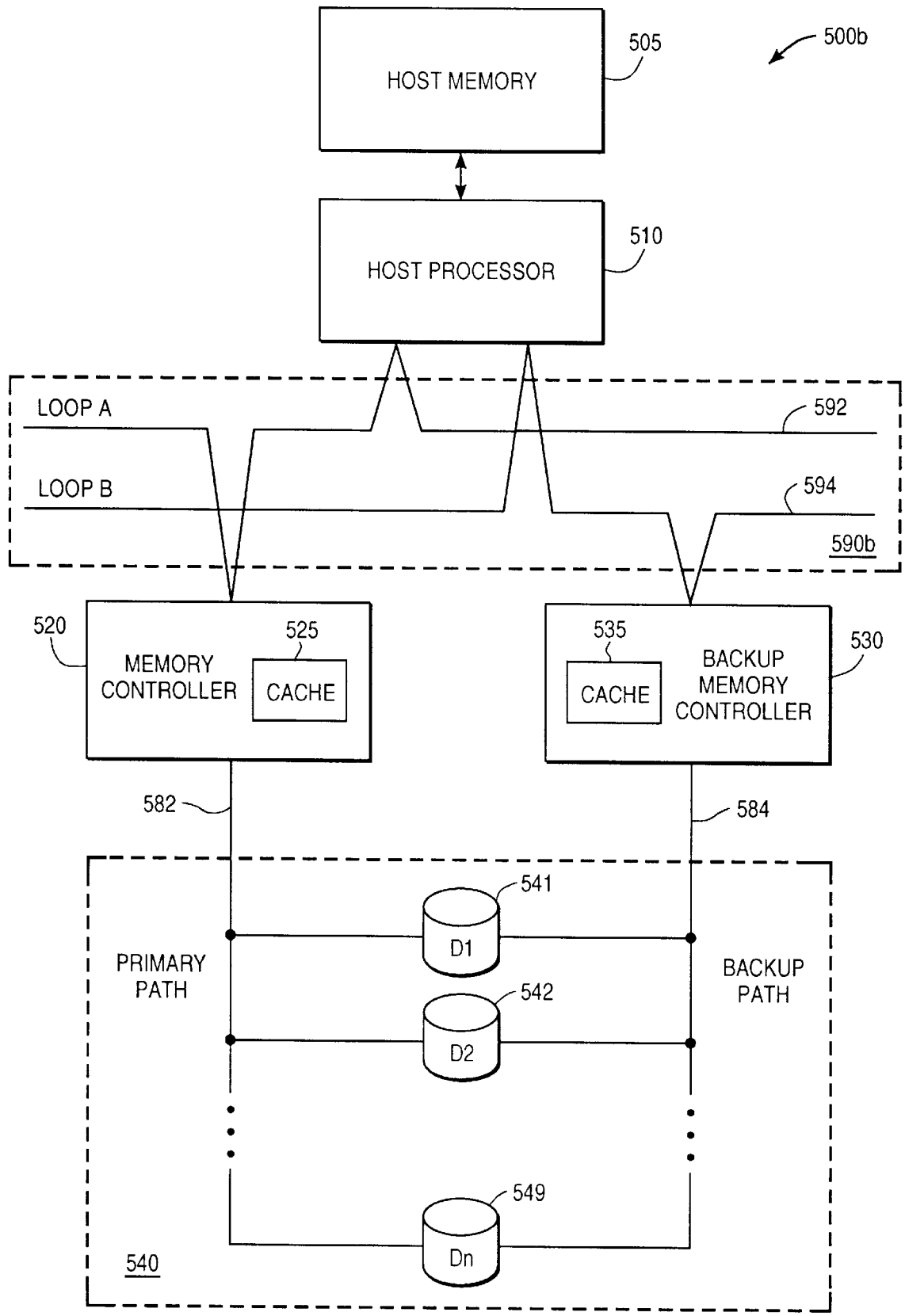

FIGS. 5A and 5B illustrate two embodiments 500a and 500b of the fault tolerant computer 400. Although system interconnects 590a, 590b of computers 500a, 500b, respectively, can be based on any suitable interconnect technology, such as FibreChannel, SCSI or Ethernet, both examplary interconnects 590a and 590b are implemented using FibreChannel loops. Similarly, while primary and backup paths 582, 584 can be based on any suitable interconnect technology, in these examples, paths 582, 584 are also FibreChannel loops. The FibreChannel arbitrated loop is currently defined by the American National Standard for Information Technology (ANSI) working draft proposal X3.272-199x.

In a steady state FibreChannel loop, "idle" packets are circulated by all the nodes of the FibreChannel loop. When a node needs to transmit, the requesting node first replaces an incoming "idle" packet with an arbitration ("arb") packet. If the "arb" packet returns to the requesting node without getting intercepted, the requesting node is allowed to transmit. If two or more nodes contend for permission to transmit, the requesting node with the highest priority wins by intercepting "arb" packet(s) with lower priority. Conversely, requesting node(s) with lower priority are required to propagate "arb" packets with higher priority.

FibreChannel packets can carry up to 2 k bytes of data and include a source address (SRC) field, a destination address (DEST) field and an offset (OFFSET) field. The offset field provides a pointer into a memory location at the destination node indicating the starting point for loading the data.

Referring now to FIG. 5A, embodiment 500a includes host processor 510, memory controller 520 and backup memory controller 530 coupled to each other by loop 592. Drives 541, 542 . . . 549 are coupled to memory controller 520 and backup memory controller 530 by primary path 582 and backup path 584, respectively.

FIG. 5B illustrates embodiment 500b which has a more robust memory architecture then embodiment 500a. In embodiment 500b, host processor 510 is coupled to memory controller 520 and backup memory controller 530 by Fibre-Channel Loop A 592 and FibreChannel Loop B 594, respectively. Mass storage memory 540 is coupled to memory controller 520 and backup memory controller 530 by primary path 582 and backup path 584, respectively. Memory 540 includes one or more memory devices such as disk drives 541,542 . . . 549. In this implementation, primary path 582 is an extension of Loop A 592 while backup path 584 is an extension of Loop B 594.

Figure 5C:
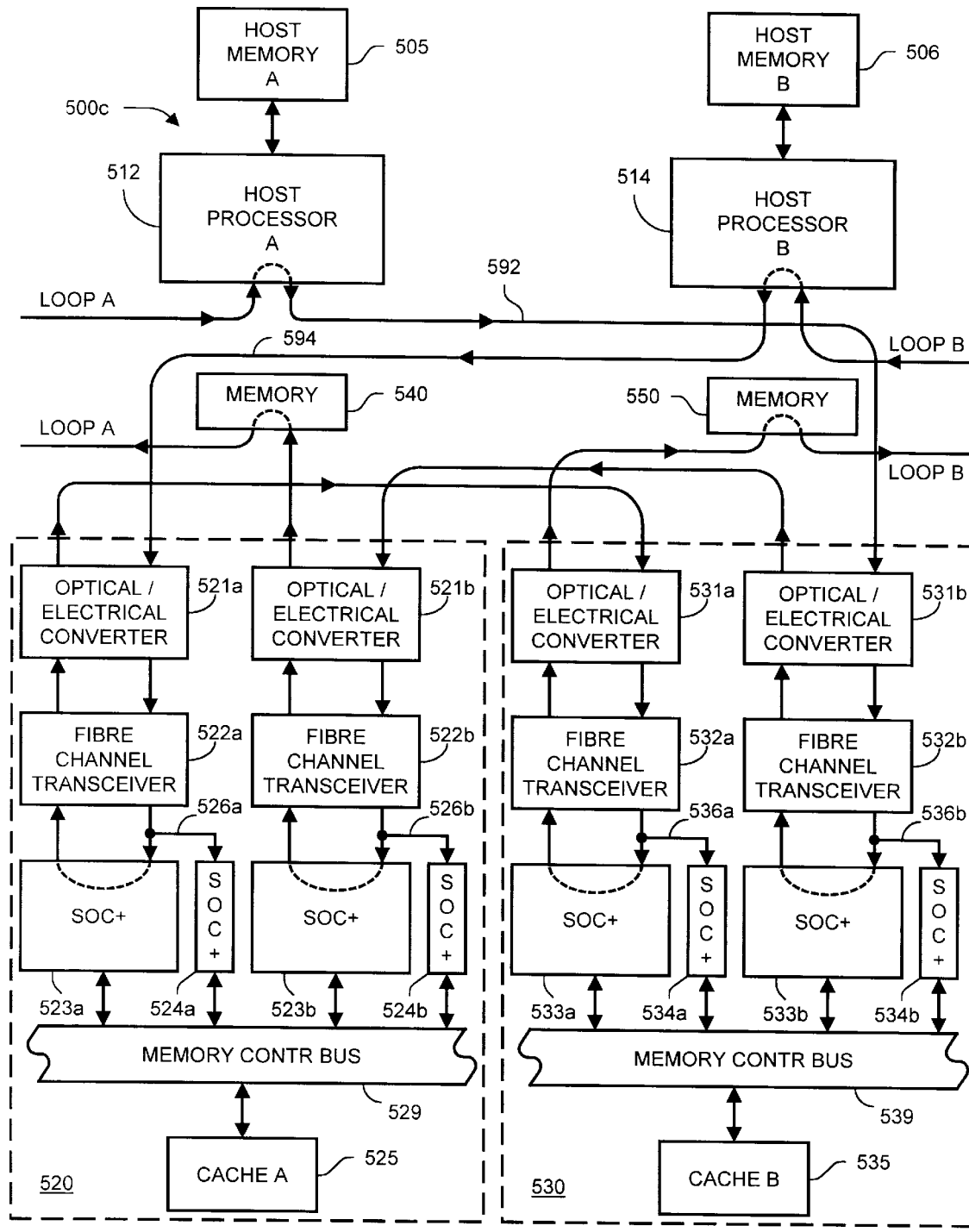
FIG. 5C illustrates another embodiment of the invention with dual processors, dual memories and dual memory controllers.

FIG 5C is a block diagram showing a hardware efficient embodiment of the present invention with exemplary pairs of taps 536b, 526b and 526a, 536a into FibreChannel loops 592, 594, respectively. System 500c includes host processors 512, 514 and memory controllers 520, 530. Memory controller A 520 includes optical/electrical converters 521a, 521b (VIXEL p/n 0027605), FibreChannel transceivers 522a, 522b (HP p/n HDMP-1526), primary Serial Optical Channel (SOC+) controllers 523a, 523b (LSI Logic p/n 100-4262-01), tapping SOC+ controllers 524a, 524b, a memory controller bus 529 and cache 525. Similarly, memory controller B 530 includes optical/electrical converters 531a, 531b, serial/parallel converters 532a, 532b, primary Serial Optical Channel (SOC+) controllers 533a, 533b, tapping SOC+ controllers 534a, 534b, a memory controller bus 539 and cache 535.

Host processors 512, 514 are coupled to memory controllers 520, 530, and to memories 540, 550 by loops 592, 594, respectively. Memories 540 and 550 can be anyone of a variety of memories, including but not limited to RAMs and magnetic/optical disk arrays. In addition, this invention may be practiced in combination with other fault tolerant and data compression/decompression techniques such as RAID and MPEG.

Memory controller A 520 also includes taps 526a, 526b coupling input nodes of primary SOC+s 523a, 523b to input nodes of tapping SOC+s 524a, 524b, respectively. Similarly, memory controller B 530 also includes taps 536a, 536b coupling input nodes of primary SOC+s 533a, 533b to input nodes of tapping SOC+s 534a, 534b, respectively. Hence, taps 526a, 526b and taps 536a, 536b enable controllers 520,530 to copy via tapping SOC+s 524a, 524b and tapping SOC+s 534a, 534b, respectively, data packets destined for each other. Thus, memory controllers 520, 530 are able to function as backup memory controllers for each other, thereby providing fault tolerance without the need for additional memory controller(s). For example, when host processor A 512 needs to send data to memory A 540, processor A 512 sends a data packet to memory controller A 520 via loop A 592. As a backup to memory controller A 520, memory controller B 530 taps loop A 592 to obtain a duplicate copy of the data packet via tap 536b.

Subsequently, both memory controllers 520,530, store the data from their respective copies of the data packet in their respective caches 525, 535. Accordingly, when controller A 520 is functional, controller A 520 transfers the data to memory A 540 via primary path 582. Alternatively, when controller A 520 is not functional, "backup" memory controller B 530 is responsible for transferring the data to memory A 540 via secondary path 584.

Conversely, when host processor B 514 needs to send data to memory B 550, processor 514 sends a data packet to memory controller B 530 via loop B 594. As a backup to memory controller B 530, memory controller A 520 taps loop B 594 to obtain a duplicate copy of the data packet. Subsequently, both memory controllers 520, 530 store the data from their respective copies of the data packet in their respective caches 525, 535. Accordingly, when controller B 530 is functional, controller B 530 then transfers the data to memory B 550 via primary path 588. Alternatively, if controller B 530 is not functional, then "backup" memory controller A 520 is responsible for completing the data transfer to memory B 550 via secondary path 586.

Hence, by adding tapping capability to both memory controllers 520,530, and backup paths 584,586, computer system 500 is now fault tolerant without the need for adding redundant memory controllers and without slowing down memory access when both memory controllers 520, 530 are functional.

Figure 6A:
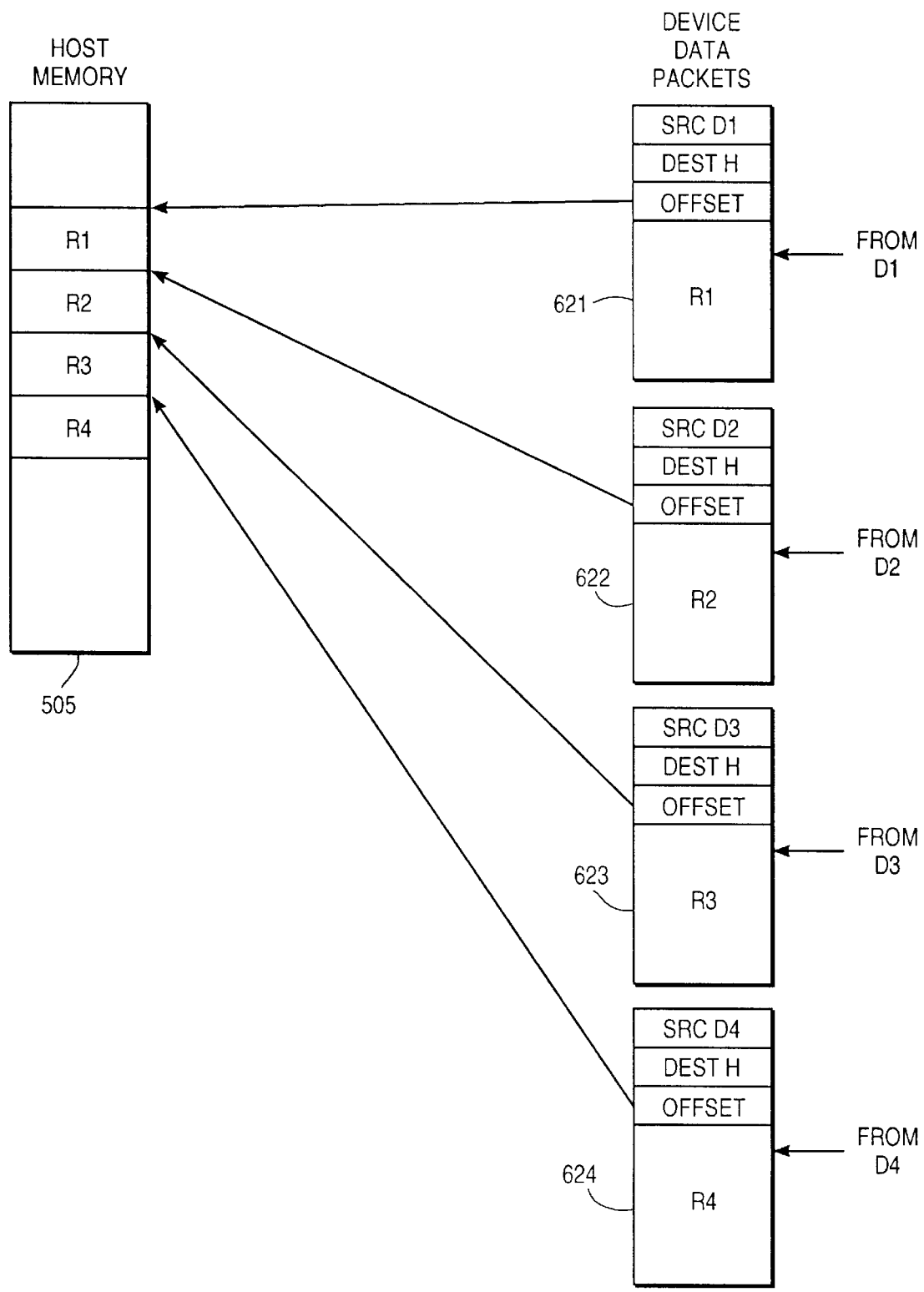
FIGS. 6A, 6B and 7 are two block diagrams and a flow diagram illustrating exemplary read operations in accordance with the present invention.
Figure 6B:
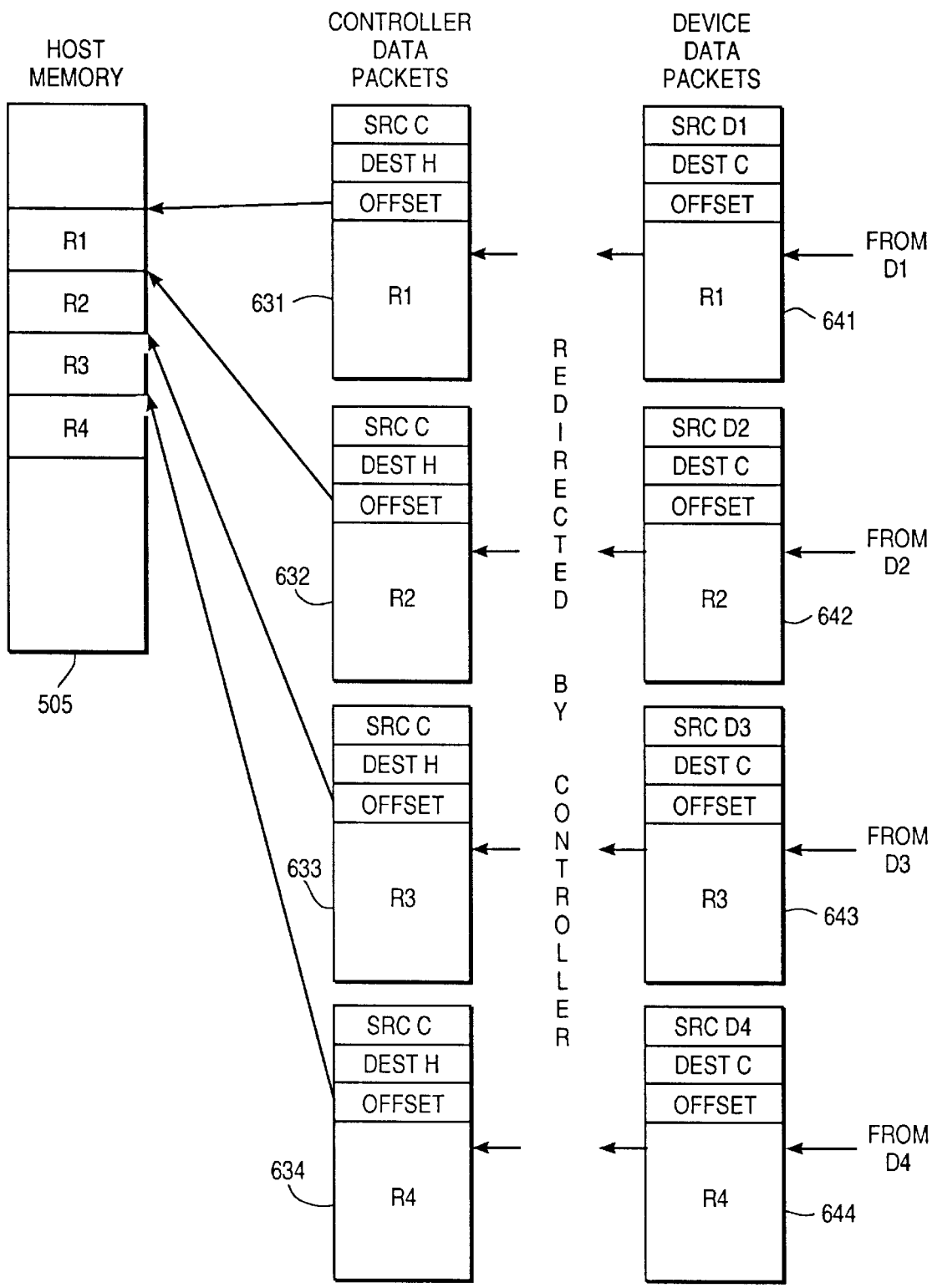
Figure 7:
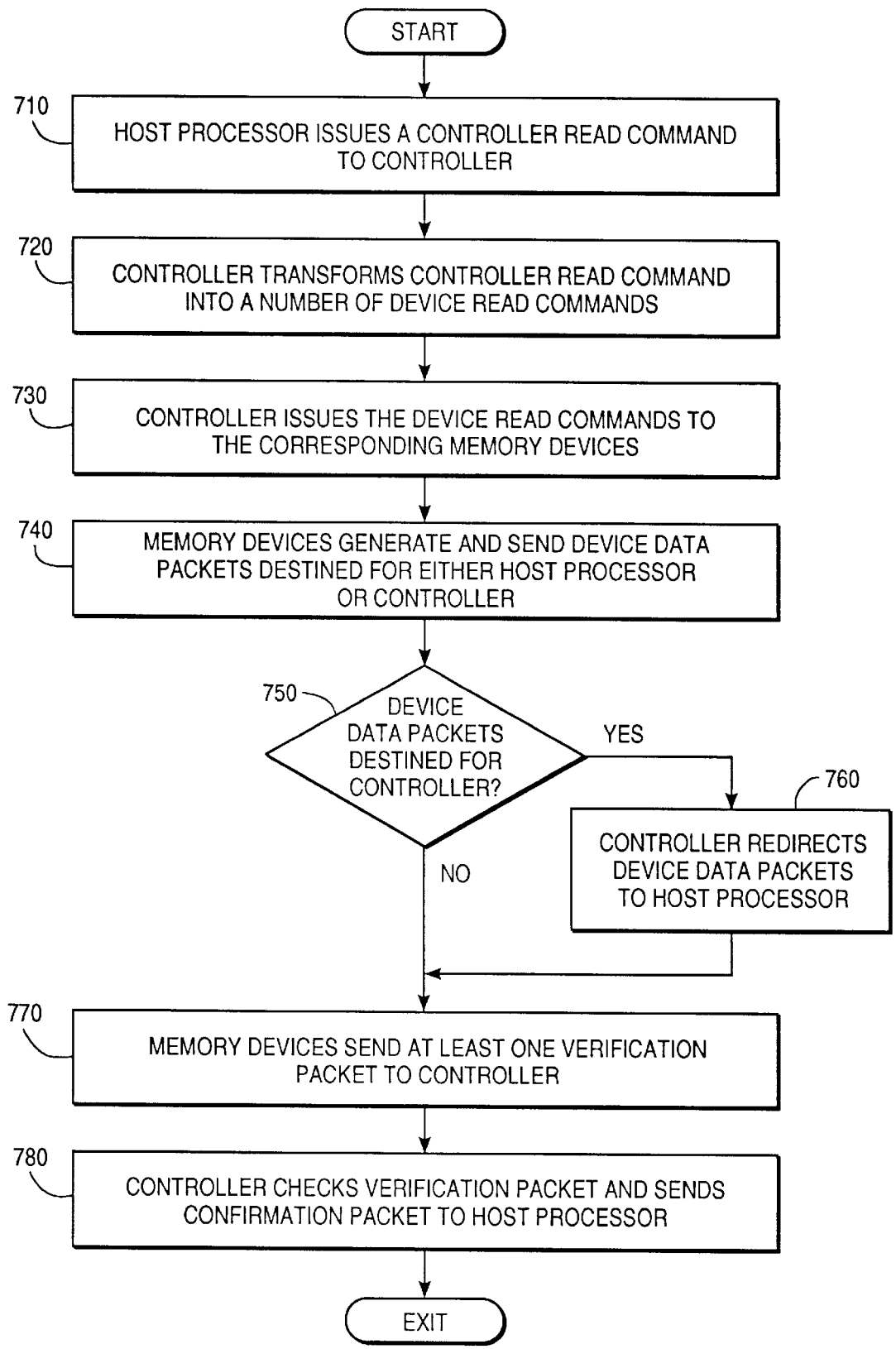

FIGS. 6A, 6B and 7 are two block diagrams and a flow diagram illustrating two exemplary methods for efficiently retrieving data from embodiment 500*b*. In accordance with the present invention, data is retrieved efficiently from drives 541,542, . . . 549 by host processor 510, under the management of memory controller 520, without the need to store the resulting data packets in controller cache 525.

Referring now to the flowchart of FIG. 7, in step 710, host processor 510 issues a controller read command to controller 520. Controller 520 then transforms the controller read command into a number of device read commands, which are issued to the corresponding drives 541, 542, . . . 549 (steps 720, 730). In response to each device read command, the respective drive 541, 542, . . . or 549 generates and sends a corresponding device data packet destined for either host processor 510 or controller 520 (step 740).

Referring back to FIG. 6A, device data packets 621, 622, 623, 624 are destined for host controller 510. Note that it is possible for devices 541,542, . . . 549 to extract the respective offset values into host memory 505 from the corresponding device read commands for read data R1, R2, R3 and R4.

Alternatively, as shown in FIG. 6B, drives 541, 542, . . . 549 send device data packets 641, 642,643,644 to controller 520 which is responsible for redirecting the data packets to host controller 510 (step 760). Although redirection is not supported by FibreChannel, additional hardware can be added to controller 520 or loop 592, or their equivalent, for replacing the destination fields with the node address of host processor 510, thereby converting device data packets 641, 642, 643, 644 into controller data packets 631, 632, 633, 634. Note that the respective offsets into host memory 505 can either be inserted by drives 541, 542, . . . 549 into device data packets 641, 642, 643, 644, or inserted by controller 520 into controller data packets 631, 632, 633, 634.

The present invention advantageously frees controller 520 from the burden of receiving, storing, retrieving and then sending the data associated with device data packets 621, 622, 623, 624 in controller cache 525. Hence, the bandwidth requirement for primary path 582 and loop A 592 is the average data transfer rate of the data packets, and not twice the average data transfer rate of data packets as in the case of the above described prior art.

In step 770, one or more of drives 541, 542, . . . 549 send at least one verification packet to controller 520. Examples of verification packets include parity packets which may be used for correcting errors. In some implementations, controller 520 may store data from the data packets long enough for comparison against the verification packets. Controller 520 checks the verification packet(s) and if there are no detectible errors, e.g., parity error or lost packet, a confirmation packet is sent to host processor 510 (step 780). In the event that the error is recoverable, e.g., correctable with the parity packet, controller 520 attempts to correct the error and send the corrected data to host processor 510 via the verification packet.

In accordance with another aspect of the present invention, FIGS. 8A, 8B, 9 and 10 are two block diagrams and two corresponding flow diagrams illustrating two exemplary methods for efficiently storing data in embodiment 500*b*. As discussed above, data is stored in drives 541, 542, . . . 549 by host processor 510, under the management of memory controller 520. Storage in drives 541,542, . . . 549 is accomplished without the need to receive controller data packets, store the data, retrieve the data and then regenerate a corresponding number of device data packets in controller cache 525. Hence the present invention advantageously reduces the bandwidth demand on loop 592.

Figure 8A:
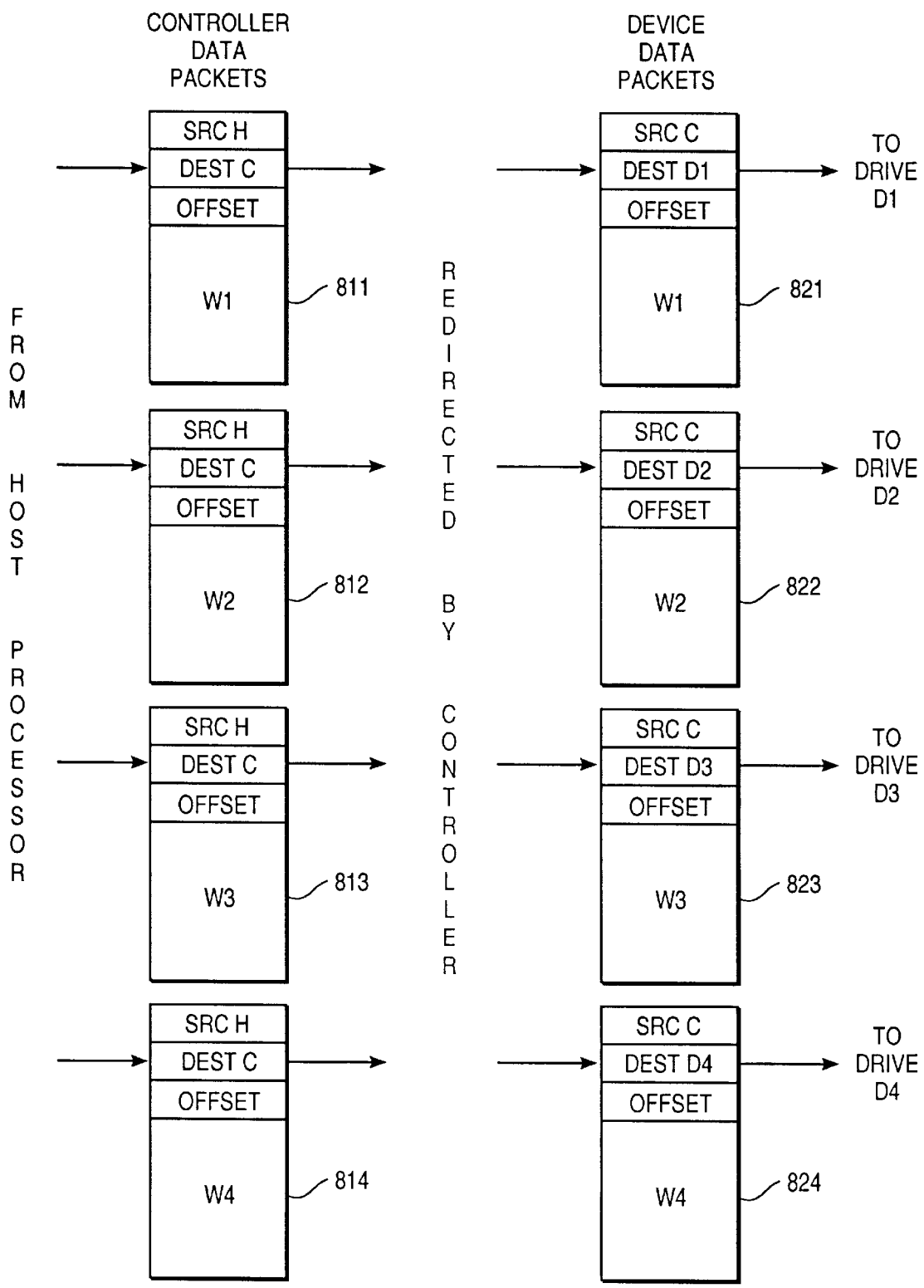
FIGS. 8A, 8B, 9 and 10 are two block diagrams and two flow diagrams illustrating exemplary write operations in accordance with the present invention.
Figure 9:
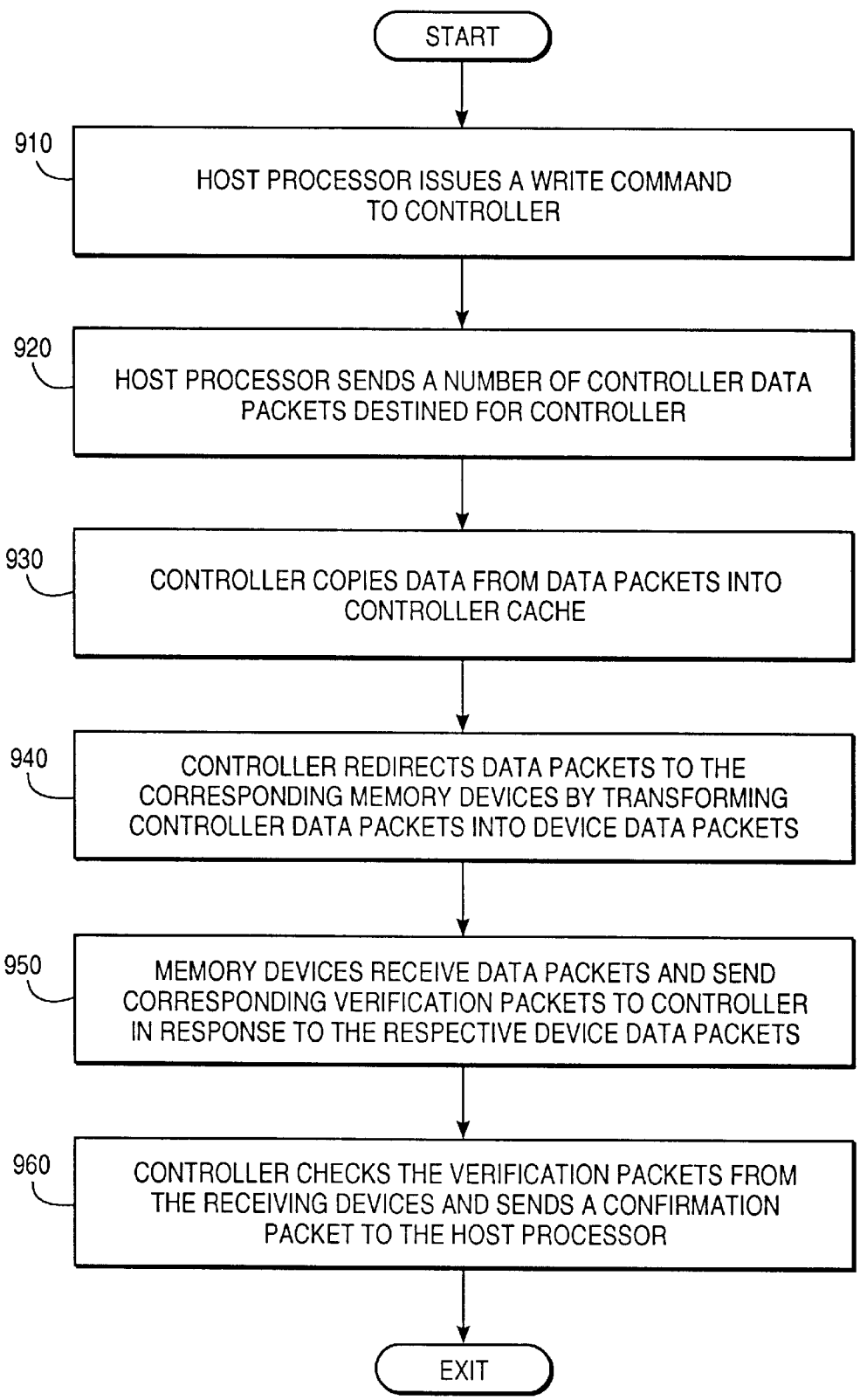

Referring to both FIGS. 8A and 9, host processor 510 issues a write command to controller 520 which includes information such as the number of eventual device data packets and the corresponding final drive destination addresses (step 910). Next, host processor 510 sends a number of controller data packets 811, 812, 813, 814 destined for controller 520 (step 920).

Upon receiving controller data packets 811, 812, 813, 814, controller 520 copies the data into controller cache 525 (step 930). Controller 520 also redirects the data packets to the corresponding memory devices 541, 542, . . . 549 by modifying the respective DEST and SRC fields, thereby transforming controller data packets 811, 812, 813, 814 into device data packets 821, 822, 823, 824, i.e., the respective destination addresses of device data packets 821, 822, 823, 824 are now drives 541, 542, . . . 549 (step 940).

Subsequently, drives 541, 542, . . . 549 receive data packets 811, 812, 813, 814 and send corresponding verification packets to controller 520 in response to the incoming data packets 811, 812,813,814 (step 950). Controller 520 then compares the information in verification packets with the information from the write command and if the write operation is error-free, then controller 520 sends a confirmation packet to host processor 510 (step 960). Examples of verification protocols include parity checking wherein one of drives 541,542, . . . 549 is a parity drive and the data packets from the remaining drives are compared with the parity packet from the parity drive.

Figure 8B:
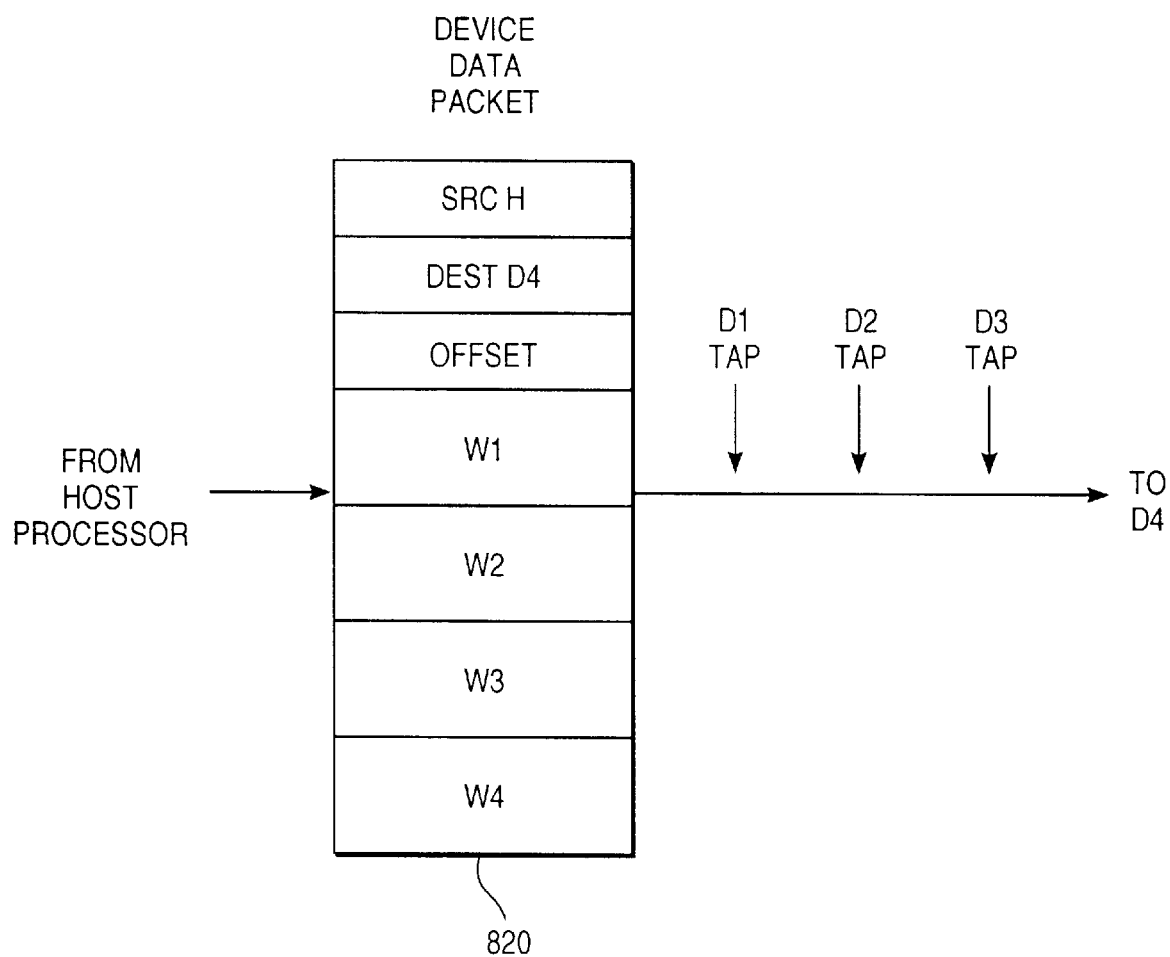
Figure 10:
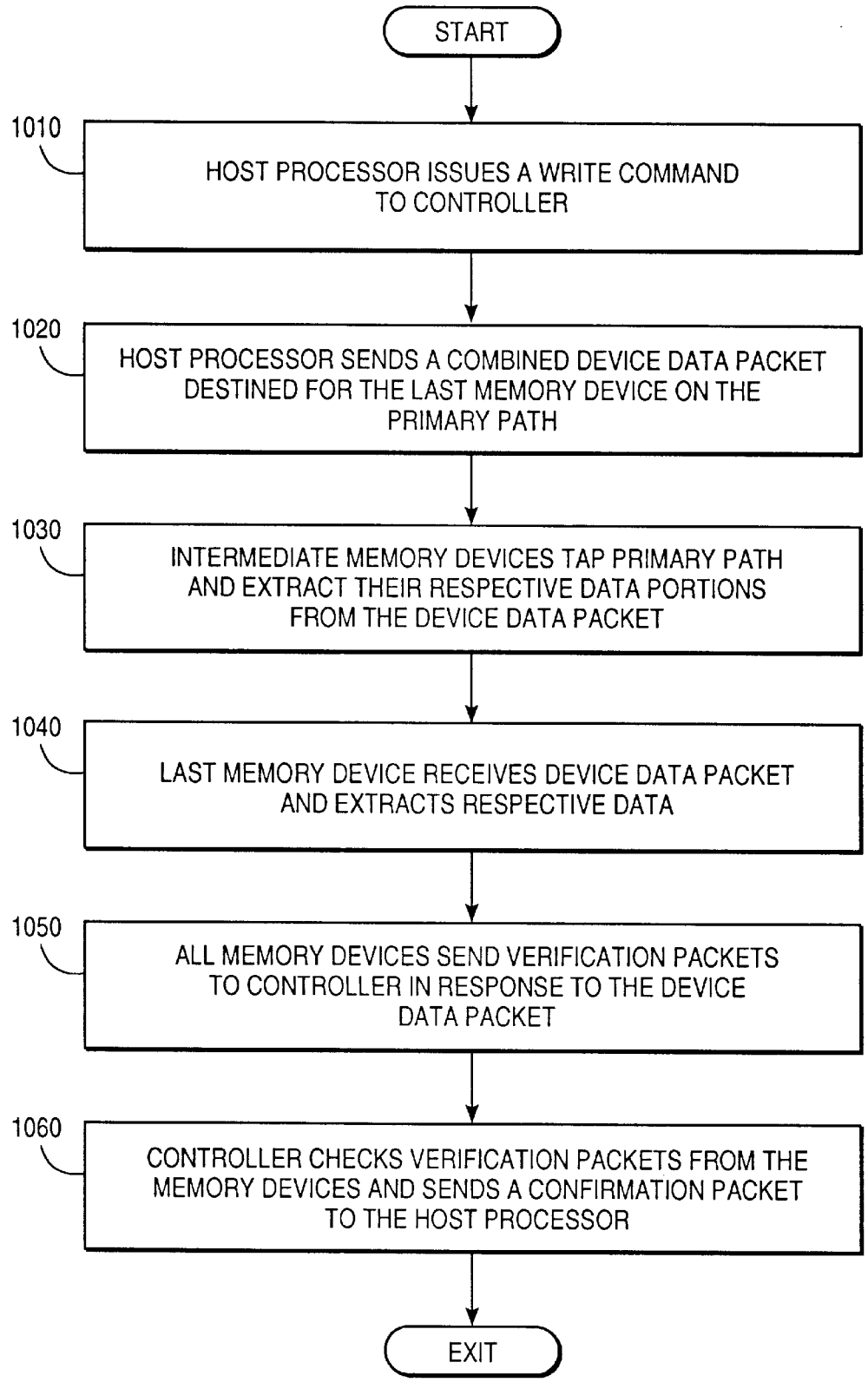

Referring now to FIGS. 8B and 10, host processor 510 also issues a write command to controller 520 which includes information about the number of devices which should respond to device data packet 820 (step 1010). Host processor 510 sends combined device data packet 820 directly to, i.e., whose destination address is, the last drive on primary path 582, e.g., drive 549 (step 1020).

Figure 5D:
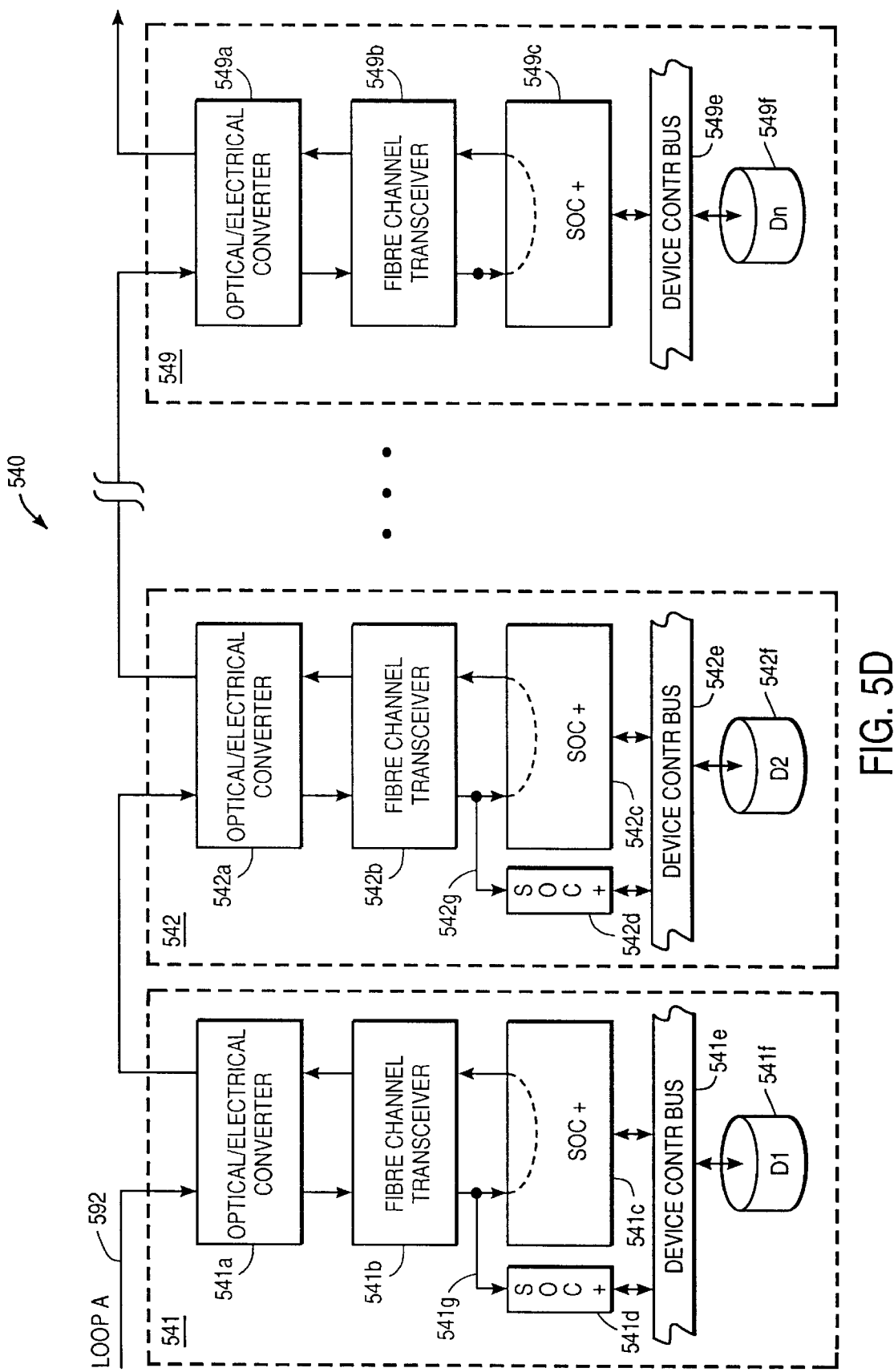
FIG. 5D is a block diagram showing a plurality of memory devices for the embodiment of FIG. 5C with tapping capability.

Subsequently, intermediate drives, e.g., drives 541,542, tap primary path 582 to extract their respective data portions from data packet 820 (step 1030). As shown in FIG. 5D, tapping SOC+s 541*d*, 542*d* are added to intermediate drives 541, 542, and are coupled to taps 541*g*, 542*g*, respectively. Such an arrangement enables drives 541,542 to "receive" data packets destined for last drive 549 without violating FibreChannel addressing protocols at the node level.

Eventually, last drive 549 on primary path 582 receives data packet 820 and extracts its data portion (step 1040). It can be appreciated that primary path 582 can be an integral part of loop 592.

The intermediate and last drives, e.g., drives 541,542, . . . 549, send corresponding verification packets to controller 520 in response to the incoming data packet 820 (step 1050). Controller 520 then compares the information in verification packets with the information from the write command, and if the write operation is error-free, controller 520 sends a confirmation packet to host processor 510 (step 1060).

In some embodiments, e.g., RAID based drives, controller 520 or the drives may be required to encode and/or decode parity information for the read/write operations described above. Such parity information can be transferred in the form of verification packets.

Other embodiments are also possible. For example, instead of the shared primary path 582 coupling drives 541,542, . . . 549 to controller 520, each drive may be coupled by a dedicated primary path, e.g., a separate Fibre-Channel loop, to the controller via a cross-bar switch. The host processor can send device data packets to the cross-bar switch via the controller. The cross-bar switch can then simultaneously send the device data packets to the respective devices. Alternatively, the host processor can send a combined data packet to the controller which forwards the combined packet to the cross-bar switch. The cross-bar switch then repackages the data into a number of device data packets, inserts the appropriate device destination address information into the device data packets and simultaneously send the device data packets to the respective devices.

While the invention has been described with reference to specific embodiments, numerous additions and modifications are possible without departing from the spirit of the invention. Hence, the scope of the invention should be determined by the following claims.

What is claimed is:

1. In a computer system having a host processor, a memory controller, a memory and an interconnect, wherein the memory includes a plurality of memory devices, a method for retrieving data from the memory comprising the steps of:

issuing a controller read command from said host processor to said memory controller via said interconnect;

transforming said controller read command into a plurality of device read commands;

issuing said plurality of device read commands from said memory controller to said plurality of memory devices;

forming a plurality of device data packets destined for said controller in response to said plurality of device read commands; and redirecting said plurality of device data packets from said controller to said host processor by transforming said plurality of device data packets into a corresponding plurality of controller device packets destined for said host processor without storing said plurality of device data packets at said controller;

wherein said transforming and said issuing said plurality of device read commands are performed without determining whether data included in said plurality of device data packets are in a controller cache.

2. The method for retrieving data from the memory as recited in claim 1 further comprising the steps of:

sending a verification packet to said memory controller from said memory;

checking said verification packet at said memory controller; and sending a confirmation packet from said memory controller to said host processor.

3. In a computer system having a host processor, a memory controller, a memory and an interconnect, wherein the memory includes a plurality of memory devices, a method for retrieving data from the memory comprising the steps of:

issuing a controller read command from said host processor to said memory controller via said interconnect;

transforming said controller read command into a plurality of device read commands;

issuing said plurality of device read commands from said memory controller to said plurality of memory device; and forming a plurality of device data packets destined for said host processor in response to said plurality of device read commands;

wherein said transforming and said issuing said plurality of device read commands are performed without determining whether data associated with said controller read command are in a controller cache.

4. The method for retrieving data from the memory as recited in claim 3 further comprising the steps of:

sending a verification packet to said memory controller from said memory;

checking said verification packet at said memory controller; and sending a confirmation packet from said memory controller to said host processor.

5. In a computer system having a host processor, a memory controller, a memory and an interconnect, wherein the memory includes a plurality of memory devices, a method for storing data to the memory comprising the steps of:

issuing a controller write command from said host processor to said memory controller via said interconnect;

sending a plurality of controller data packets destined from said host processor to said controller;

redirecting said plurality of controller data packets from said controller to said plurality of memory devices by transforming said controller data packets into a corresponding plurality of device data packets without storing said plurality of controller data packets at said controller; and receiving said plurality of device data packets at said memory devices;

wherein said redirecting is performed without determining whether data associated with said controller write command are in a controller cache.

6. The method for storing data to the memory as recited in claim 5 further comprising the steps of:

sending a plurality of verification packets destined for said controller in response to said device data packets;

checking said verification packets at said memory controller; and sending a confirmation packet from said memory controller to said host processor.

7. In a computer system having a host processor, a memory controller, a memory and an interconnect, wherein the memory includes at least one intermediate memory device and a last memory device, a method for storing data to the memory comprising the steps of:

issuing a controller write command from said host processor to said memory controller via said interconnect;

sending a combined device data packet destined for said last memory device;

tapping said combined device data packet by said at least one intermediate memory device to extract at least one corresponding data portion from said combined device data packet; and receiving said combined device data packet by said last memory device to extract corresponding data portion from said combined device data packet.

8. The method for storing data to the memory as recited in claim 4 further comprising the steps of:

sending a plurality of verification packets destined for said controller in response to said combined device data packet;

checking said verification packets at said memory controller; and sending a confirmation packet from said memory controller to said host processor.

9. A method of transferring data in a fault-tolerant computer system from a storage device to a host processor, comprising:

receiving a data request at a storage device controller from a host processor coupled to said storage device controller, said storage device controller comprising a cache;

dividing said data request into a plurality of device requests;

transmitting said device requests to a set of storage devices;

receiving a first data packet at said storage device controller from a first storage device of said set of storage devices, wherein said first data packet comprises:
a destination field containing an address of said storage device controller; and
a source field containing an address of said first storage device; and in said storage device controller, without storing said first data packet in said cache:
storing an address of said host processor in said destination field; and
storing an address of said storage device controller in said source field;

wherein said dividing and said transmitting are performed without determining if said requested data is in said cache.

10. The method of claim 9, in which said first data packet further comprises an offset field configured to store an address in a host memory, wherein a first offset retrieved from a first device request is stored in said offset field by said first storage device.

11. A method of receiving a set of data packets at a host processor from a plurality of data storage devices in a fault-tolerant computer, comprising:

receiving a read memory command from a first host processor at a first memory controller of a fault-tolerant computer over a first channel coupling said first host processor to said first memory controller and a plurality of data storage devices, wherein said first memory controller comprises a cache;

intercepting said read memory command at a second memory controller tapped into said first channel, wherein access to said plurality of data storage devices by said first host processor is conducted through said second memory controller if said first memory controller is inoperative;

generating a set of device read commands upon receipt of said read memory command;

issuing said set of device read commands to said plurality of data storage devices;

receiving a series of data packets from said plurality of data storage devices; and directing said series of data packets to said first host processor without storing any of said data packets in said cache;

wherein said generating, issuing, receiving and directing are performed by said first memory controller unless said first memory controller is inoperative, in which case said generating, issuing, receiving and directing are performed by said second memory controller; and wherein said generating and issuing are performed without determining if data requested in said read memory command is in said cache.

12. The method of claim 11, wherein said receiving a set of data packets comprises:

receiving at a first data storage device a first device read command;

generating at said first data storage device a first data packet comprising:
a first portion of data, stored on said first data storage device, responsive to said read memory command;
a destination field configured to store an address of a destination of said first data packet;
a source field configured to store a source of said first data packet; and
an offset field configured to store an offset into a host memory; and transmitting said first data packet from said first data storage device.

13. The method of claim 12, wherein said first data storage device stores an address of said first host processor in said destination field prior to said transmitting.

14. The method of claim 12, wherein said first data storage device further comprises, prior to said transmitting:

storing an address of said first memory controller in said destination field; and storing an address of said first data storage device in said source field.

15. The method of claim 14, wherein said first data storage device further comprises, prior to said transmitting;

retrieving an offset into a host memory from said first device read command; and storing said retrieved offset in said offset field.

16. The method of claim 11, wherein said directing comprises:

inserting an address of said first host processor into a destination field of each data packet of said series of data packets; and inserting an address of one of said first memory controller and said second memory controller into a source field of each said data packet.

17. The method of claim 16, wherein said directing further comprises inserting an offset in a first host memory into an offset field of each data packet of said series of data packets.

18. In a fault tolerant computer system comprising:

a first host processor;

a first interconnect coupled to said first host processor;

a first memory controller coupled to said first host processor via said first interconnect, the first memory controller configured to receive a first data packet from said first host processor via said first interconnect;

a second memory controller coupled to said first host processor via said first interconnect;

a first tap coupled between said first interconnect and said second memory controller, said first tap configured to obtain a backup copy of said first data packet for said second memory controller as said first data packet is being sent from said first host processor to said first memory controller via said first interconnect; and a first memory;

a method for retrieving data from the first memory comprising the steps of:

issuing a controller read command from said first host processor to said first memory controller via said first interconnect;

transforming said controller read command into a plurality of device read commands;

issuing said plurality of device read commands from said first memory controller to a plurality of memory devices including said first memory;

forming a plurality of device data packets destined for said first memory controller in response to said plurality of device read commands; and redirecting said plurality of device data packets from said first memory controller to said first host processor by transforming said plurality of device data packets into a corresponding plurality of controller device packets destined for said first host processor without storing said plurality of device data packets at said first memory controller;

wherein said transforming and said issuing are performed without determining if data in said device data packets is in a controller cache.

* * * * *